United States Patent [19]

Dahle

[11] 4,401,681
[45] Aug. 30, 1983

[54] TWO-PHASE FOOD PRODUCTS WITH REDUCED INTER-PHASE MOISTURE TRANSFER

[75] Inventor: Leland K. Dahle, Cherry Hill, N.J.

[73] Assignee: Campbell Soup Company, Camden, N.J.

[21] Appl. No.: 304,356

[22] Filed: Sep. 22, 1981

[51] Int. Cl.³ .............................................. A21D 13/00
[52] U.S. Cl. .................................... 426/94; 426/272; 426/302; 426/577; 426/578
[58] Field of Search ................ 426/94, 103, 283, 302, 426/305, 307, 556, 573, 577, 578, 589, 465, 272

[56] References Cited

U.S. PATENT DOCUMENTS

| 3,140,186 | 7/1964 | Bender | 426/577 |
|---|---|---|---|
| 3,676,148 | 7/1972 | De Wesse et al. | 426/283 |
| 3,676,151 | 7/1972 | Scharschmidt | 426/556 |
| 4,275,082 | 6/1981 | Dougan | 426/556 |

OTHER PUBLICATIONS

Tressler and Sultan, *Food Products Formulary*, vol. 2, Avi Pub. Co., Inc., Conn., 1975, pp. 87-88 and 116.

Primary Examiner—Raymond N. Jones
Assistant Examiner—Elizabeth A. Hatcher
Attorney, Agent, or Firm—Schuyler, Banner, Birch, McKie & Beckett

[57] ABSTRACT

Improved composite food products are provided with a moisture impermeable barrier layer at the interface between high and low moisture components. This barrier layer is achieved by providing the high moisture component with dextrin and a hydrophilic polysaccharide gelling agent such as pectin in amounts sufficient to form the barrier layer. This process is particularly applicable to composite products including a dough-based component and a topping or filling of higher moisture content. Examples of such products include jam or jelly filled cookies and pizza sauce/crust combinations.

15 Claims, No Drawings

TWO-PHASE FOOD PRODUCTS WITH REDUCED INTER-PHASE MOISTURE TRANSFER

TECHNICAL FIELD

The present invention relates to improved two-phase food products comprising a high moisture phase and a low moisture phase in which the migration of fluids across the interface between these two phases is substantially reduced. The invention finds particular utility in food products comprising a low moisture baked component containing a high moisture carbohydrate-based filling or topping such as a sauce, jam, jelly or the like.

BACKGROUND OF THE INVENTION

In the food industry there are many occasions when it is desirable to combine diverse food products to produce a composite food product having enhanced consumer appeal. In such a composite product it generally is desirable from both the aesthetic and the taste standpoint to maintain the separate identity of each of the component materials. A significant problem can arise, however, when the diverse component materials combined have different moisture contents. In these circumstances, fluid may migrate from a component which has a high moisture content to the other component which has a lower moisture content. This problem is particularly severe in the case of products containing baked, dough-based components which consumers expect to have a relatively dry texture. The incorporation of high moisture food components such as jams, jellies, sauces and the like as fillings or toppings to baked products can result in excessive migration of fluids into the baked good component. This not only adversely affects the separate identity of the components but can render the baked component unacceptably moist or soggy, especially where the product is stored at room temperature for an extended period between preparation and consumption.

In attempting to overcome the problem of moisture migration, the prior art has turned to various coating and interlaying techniques. See, for example, Calia U.S. Pat. No. 2,363,395; Forkner U.S. Pat. No. 2,878,127; and Haas et al. U.S. Pat. No. 3,934,043. These techniques, however, generally require complicated processing steps utilizing costly apparatus and materials and as a result these methods have not proven successful. Accordingly, it would be of great value to the food industry if a process could be provided which would simply and inexpensively provide composite food materials of this type with the ability to substantially resist fluid migration across component interfaces.

SUMMARY OF THE INVENTION

Accordingly, it is an object of the present invention to provide a process which ameliorates the prior art problem of moisture migration without resort to expensive and complicated manipulative steps.

It is a further object of the present invention to provide a method for treating the high moisture food components of a composite food product to effect the in situ development of a moisture barrier layer at the interface between this component and a contiguous low moisture component.

A more specific object of the invention is to provide an improved composite product including at least one dough-based component which is protected against substantial moisture migration from a high moisture component such as a filling or topping.

Accordingly, therefore, these objects and others which will readily occur to those skilled in the art are accomplished by providing a process for preventing the migration of fluid from a high moisture phase of a composite food product to a low moisture phase of said composite food product, said process comprising the steps of (a) providing a high moisture phase with at least about 5% by weight of dextrin and at least about 1% of another hydrophilic polysaccharide gelling agent; and (b) dehydrating said high moisture phase to provide a barrier layer of substantially reduced moisture permeability at the interface between said high moisture phase and said low moisture phase.

The present invention also provides a composite food product having at least one high moisture phase in contiguous relationship with a low moisture phase and having a barrier layer of substantially reduced moisture permeability located at the interface between said high moisture phase and said low moisture phase, said barrier layer being formed by surface dehydration of a high moisture phase containing reaction products of dextrin and another hydrophilic polysaccharide gelling agent.

In the preferred embodiment, baked goods such as cookies, pastries, cakes, pies and the like, containing a highly viscous or gel-like filling or topping of materials such as sauces, jellies or jams is provided with reduced inter-phase moisture migration characteristics by incorporating in the high moisture component a mixture of dextrin and a polysaccharide gelling agent such as pectin. While many presently employed filling and topping materials may contain one or more members of the class of polysaccharide materials described, applicant has discovered that the desired reduction of moisture migration via the formation of a barrier layer can be achieved by utilizing dextrin and another polysaccharide gelling agent in amounts which generally exceed those presently employed. By utilizing the described materials in the specified amounts, applicant has achieved an improved food product which exhibits substantially reduced moisture migration.

DESCRIPTION OF THE INVENTION

The present invention finds applicability in a wide variety of food product types. In general, the present invention is applicable to any composite product which has at least one high moisture component or phase and at least one additional contiguous component or phase which is of lower moisture content such that a natural moisture concentration gradient exists. In most instances the low moisture product will comprise a baked good or similar dough-based compositions. By the term dough-based compositions as used herein, applicant intends to refer to any products based on mixtures of flour and water. Examples of materials of this type include cookies, cakes, pies, pastries, doughnuts, bread, pizza crusts, pancakes, waffles, taco shells, crepes and the like. Among the various high moisture components which are typically associated with the foregoing materials are fillings and toppings based on jellies, jams, preserves, marmalades, fruit butters, sauces and the like.

In general the moisture content of each of the two components of the above-described composite product can vary widely as long as a substantial gradient exists between the high moisture and low moisture components. Typically, where the low moisture component is a baked dough-based composition, its moisture contents will generally range from about 20 to 40% by weight. Typical moisture contents for jellies, jams and sauces will vary from about 25 to 60% by weight.

While it is apparent from the foregoing that the invention is broadly applicable to a wide variety of food types, for sake of convenience, the invention hereinafter will be described primarily with respect to two representative product types, i.e., a cookie product containing a jelly or jam-like filling and a shelf stable pizza product including a pizza crust having a tomato sauce topping thereon.

In accordance with the process of the present invention, the improved composite product exhibiting decreased moisture migration from the high moisture phase to the low moisture phase is produced by providing a moisture impermeable layer at the interface between the two phases. In the preferred form of the present invention, this moisture impermeable barrier layer is created in situ by treating the high moisture phase so that upon surface dehydration of this phase, the barrier layer is formed. In its broadest aspects the present invention utilizes two essential ingredients in the treatment of the high moisture component to facilitate formation of this barrier layer. These two materials are dextrin and another hydrophilic polysaccharide gelling agent.

Dextrin (sometimes referred to in the art as dextrins because it represents a class of polymeric materials of varying molecular weight) is a carbohydrate intermediate between starch and the sugars produced from starch by hydrolysis. Typically, dextrins may range in molecular weight from about 200 to about 5,000, with each material presenting varying molecular weight profiles. Dextrin can be employed in pure form, that is, separated from the other starch hydrolysis products resulting from the process of its manufacture. It is preferred, however, to utilize dextrin in admixture with the reducing sugars produced by this hydrolysis process. Typically, these hydrolysis products include viscous syrupy liquids collectively called corn syrup. Corn syrup is a mixture of dextrose, maltose, and dextrin with about 20% water. Another suitable source of dextrin is corn syrup solids, i.e., dried corn syrup having a Dextrose Equivalent (DE) of about 20 or greater, or malto-dextrins which are dried hydrolysis products having a DE of less than about 20. In the preferred formulations according to the present invention, low DE malto-dextrins or corn syrup solids are the preferred dextrin containing materials employed. As the DE value of these corn syrup materials increases, the number average molecular weight of the dextrin fraction decrease. Also, in a known fashion, as the DE value of these corn syrup products increases, the weight percent fraction of high polysaccharides (i.e., dextrins) in this material will decrease. As an example, corn syrup solids having a DE value of about 22 exhibit a number average molecular weight of about 1,000 and comprise about 80% by weight of materials classified as dextrins.

The other essential reactive ingredient utilized according to the process of the present invention is another hydrophilic polysaccharide gelling agent. Included in this class of materials are naturally occurring and synthetic polysaccharides from a number of sources such as tree and shrub exudations, seaweed colloids, seed extracts, cellulose drivatives and pectins. Contemplated are tree and shrub exudations such as gum tragacanth, gum arabic, ghatti gum, furcelleran gum and its salts, and gum karaya; seaweed colloids such as agar, carrageenan and alginates, including various commonly utilized salts of these materials such as those of calcium, potassium, sodium, and ammonium; seed extracts such as locust bean, quince and guar gum; cellulose derivatives such as alkali metal carboxymethyl cellulose (e.g., sodium), hydroxypropylmethyl cellulose, carboxymethyl polymethyl cellulose, hydroxypropylethyl cellulose, hydroxypropyl cellulose and the like; pectins such as citric and apple pectins, low methoxyl pectins and sodium pectinate and mixtures thereof. In selecting one or more of the foregoing hydrophilic polysaccharide gelling agents for use in the process of the present invention it is merely necessary that the selected gelling agent be compatible with the high moisture food product in question and that it have the capability of reacting with dextrin in this system to provide a barrier film against the migration of moisture into the lower moisture phase of the composite product. Selection of appropriate materials based on cost and compatibility in a particular system will be readily apparent to one skilled in the art upon routine investigation. The preferred hydrophilic polysaccharide gelling agents useful according to the present invention are pectins.

Pectins are polygalacturonic acid esters, usually the methyl esters, which on hydrolysis form pectic acid in overripe fruits. Pectic acid forms a jelly with calcium salts, as in the setting of jams and fruit preserves, and has long been known for use in the manufacture of jellies, where it forms a gel with sugars present. Pectin is typically used as a powder or syrupy concentrate. Such materials are obtainable by dilute acid extraction of the inner portions of the rind of citrus fruits or fruit pomaces, usually apple. They are normally purified by decolorization, followed by concentration by evaporation, or they may be precipitated with alcohol or acetone. Pectins are available in pure (National Formulary) grade, containing not less than 6.7% of methoxy groups and not less than 74% galacturonic acid, and also are available in 150-, 200- and 250-jelly grades, which contain various diluents. Pectins include slow and rapid set pectins having a wide range of degrees of methylation. Typically, high methoxy pectins are employed in high sugar jams and jellies; low methoxy pectins used in combination with calcium salts may be used in lower sugar (i.e., reduced calorie) jams and jellies. The pectins may be employed as their salts, e.g., alkali metal salts such as sodium and potassium pectinates. Preferably, powdered pectins will be employed at particle sizes which promote relatively easy solubility in aqueous systems. Typically, powders having particle sizes such that 100% thereof will pass through an 80 mesh screen and about 60% maximum will pass through a 140 mesh screen are used. Pectins generally have a molecular weight which may vary anywhere from about 30,000 to 300,000.

In general, the amounts of dextrin and the other gelling agent (hereinafter generally referred to for convenience as pectin) employed in the process of the present invention will vary widely depending on the nature of the high moisture component into which they are incorporated and on the particular gelling agent employed. In its broadest aspects the present invention contemplates the addition of dextrin and pectin in amounts at least sufficient to provide the requisite barrier layer at the two phase interface of the particular product being prepared. Moreover, excess additive amounts over that necessary to achieve the desired result may be included unless economics or adverse product effect dictate otherwise. In addition, since the desired barrier forming reaction is one that takes place primarily on the surface, the amounts of these materials can be significantly reduced if the materials are added only to an outer layer of the high moisture component.

In general, the dextrin and pectin reactants should be provided in a weight ratio of dextrin:pectin of about 5:1 to 25:1 and preferably about 10:1. In general, the high moisture components of the present invention should be provided with at least about 5% dextrin and at least about 1% pectin. In the case of high moisture products of a jam or jelly type, pectin is typically in an amount by weight of from about 1 to 5% and preferably 1 to 3% by weight and dextrin is provided in an amount of from about 5 to 50% and preferably about 20 to 40% by weight. Where gelling agents other than pectin are employed, the preferred addition range may vary somewhat from that given for pectins due to differences in reactivity of the various materials in the chosen system. One skilled in the art, however, can readily determine these optimum additive amounts by evaluating the relative reactivity of a particular gelling agent in a given system.

While not wishing to be bound by any particular theory, applicant believes that the barrier layer formed according to the process of the present invention results from a chemical association of the pectin and dextrin macromolecules. Both of these materials contain a large number of free OH groups and it may be postulated that the resulting film-forming association is effected at least in part by hydrogen bonding between these materials.

While some high moisture food products of the type utilized according to the present invention contain, as conventionally formulated, one or more of pectin, dextrin and the like, these products typically contain one or more of these materials in lower levels than that employed according to the present invention. In the formulation of jellies and jams, the addition of pectin in amounts of from about 0.5 to 1.2% based on the total carbohydrates in the system is typical. In the process of the present invention, however, additional pectin is added to bring the total pectin concentration up to about 1.3 to 6.5% by weight based on the total carbohydrates in the system. In addition, pectins are present in small quantities in tomato based products, usually in amounts of up to about 1.0% by weight based on the total sauce. In the process of the present invention, however, such products are modified by the incorporation of from about 1 to about 5% and preferably about 3% by weight of pectin.

Similarly, many food prodcts are known to contain various grades of corn syrup products. Depending on the Dextrose Equivalent and other properties, these corn syrup products generally can include from about 5 to 95% dextrin. Typically a 24 DE product will have about 80% dextrins; a 42 DE product has about 50% dextrins and a 64 DE product has about 15% dextrins. Certain types of jellies and jams have been formulated with both pectin and corn syrup, the latter being provided as part of the sweetening agent. See, for example, Cooper U.S. Pat. No. 3,892,871. While these or similar jellies may have been employed in conjunction with baked products, see, e.g., Preserver's Handbook, pp. 124-125, 7th Ed., 1964, Sunkist Growers Inc., any such corn syrup addition would have been to take advantage of the cost effective saccharogenic properties and not the dextrin content of this additive.

Applicant's invention, however, is based on the discovery that when both pectin and dextrin are present in sufficient quantities in the high moisture food component, that these materials can be dehydrated to form a surface barrier layer around the high moisture phase and thereby prevent migration of fluid from this phase to the low moisture phase.

In the process of preparing food products according to the present invention the first step is to provide a high moisture component with the requisite dextrin and pectin levels. As indicated above, commercial formulations of typical products of this nature may have certain amounts of one of more of the two essential ingredients according to the present invention. It is necessary to provide this high moisture phase with appropriate levels of both ingredients. Where one of the ingredients is already present in sufficient quantity, it is merely necessary to add sufficient quantity of the other essential ingredient. In many cases, however, it will be necessary to add or increase the amounts of both essential ingredients in a commercially formulated product.

As indicated above, it may, in certain circumstances, be possible to provide additions of dextrin and pectin only at the surface of the high moisture food component to be integrated into the composite product. In order for this embodiment to be utilized, however, it is necessary that the high moisture component have a definite shape which will be retained after its incorporation into the composite. In such circumstances, the incorporation of dextrin and pectin in the surface layer of such a product can be effected by any well known coating techniques. To facilitate this coating operation it is generally desirable to form an aqueous solution or dispersion containing dextrin and pectin in the ratios described above. In this embodiment, the total amount of pectin/dextrin in the high moisture phase can, of course, be less than that present in the above-described embodiment, as long as the concentrations present in the surface layer are sufficient to provide the requisite barrier layer.

After the dextrin/pectin mixture is incorporated into or applied onto the high moisture component of the present invention, the next step involves dehydration of at least the surface of the high moisture component to promote the formation of a barrier film. In practice this dehydration step can be effected either before or after the high moisture component is incorporated into the composite product and thereby brought into contiguous relationship with the low moisture component. In operations where dehydration is affected before incorporation, the high moisture component preferably is formed into a shape substantially the same as that it will have in the final product, and the surface of this shaped component is dehydrated in any suitable manner. For example, simple exposure to ambient air may affect the requisite dehydrating and film-forming steps. In other instances, it may be necessary to subject the component to moving hot air currents in an oven or by forming the product and allowing the shaped component to drop in free fall through a dehydrating countercurrent air flow. It may also be desirable in some instances to cast or otherwise place the shaped high moisture component on a moving conveyor surface, which surface can be made from a material which extracts moisture from that portion of the shaped component in contact therewith. Where the low moisture component of the present invention can tolerate limited moisture migration in the vicinity of the incorporated high moisture component, it is often desirable to effect the necessary surface dehydration of the high moisture phase by simply incorporating this phase into the low moisture phase and effecting the dehydration by initial limited moisture migration. After this initial moisture migration, the resulting dehydrating effect on the high moisture phase will result in the formation of the desired barrier layer at the phase interface. Thus, products properly formulated according to the present invention may be conveniently protected against excessive moisture migration by an in situ developed moisture barrier.

The following examples are intended to illustrate more fully the nature of the present invention without acting as a limitation on its scope.

EXAMPLE 1

This Example demonstrates the process of the present invention as applicable to produce jam-filled cookies which do not become soggy upon storage due to moisture migration from the jam to the cookie structure. A conventional cookie dough containing the following basic ingredients was prepared:

| Soft Wheat Cookie Flour | 225 grams |
|---|---|
| Shortening | 180 grams |
| Baking Powder | 2 grams |
| Sugar | 90 grams |
| Water | 60 grams |

20 grams of dough was formed into a cookie shape having a central depression in the upper surface and baked. 10 grams of a separately prepared jam of the following composition was placed in the cookie depression and the composite was packaged for storage:

| Corn Syrup (22-24 DE) | 144 grams* |
|---|---|
| Fructose | 86 grams |
| Sugar | 180 grams |
| Apple Concentrate | 15 grams |
| Citric Acid (50%) | 0.1 grams |
| Water | 100 grams |
| High Methoxy Pectin | 6 grams |

*Containing approximately 94 grams of dextrin.

In an alternative embodiment, the jam component may be placed in the depression of a raw dough cookie and the composite then baked. After an initial dehydration phase during which some moisture migrated from the jam into the cookie dough, a completely encapsulating membrane-like structure was formed. This membrane or film was pliable and relatively nonsticky and prevented any substantial amount of further fluid migration from the jam into the dry baked product. Upon storage for periods of up to several months, moisture migration into the baked cookie product was minimal.

EXAMPLE 2

The procedure of Example 1 was repeated with a jam of the following composition:

| Malto-dextrin (15 DE) | 90 grams* |
|---|---|
| Fructose | 96 grams |
| Sugar | 120 grams |
| Apple Concentrate | 12 grams |
| Citric Acid (50%) | 0.1 gram |
| Water | 115 grams |
| High Methoxy Pectin | 18 grams |

*Contains approximately 80 grams of dextrin

A cookie with good water migration characteristics was produced.

EXAMPLE 3

This Example demonstrates the production of a pizza product in which moisture from the sauce-like topping does not migrate into the crust during shelf life. A conventional pizza dough of the following composition was formed into an appropriate shape and baked:

| Bread Flour | 200 grams |
|---|---|
| Water | 120 grams |
| Vegetable Oil | 10 grams |
| Salt | 4 grams |
| Yeast | 10 grams |

This baked crust was then coated with a pizza sauce prepared as follows. A sauce base of the following composition was prepared:

| Tomato Paste (26% solids) | 27 grams |
|---|---|
| Water | 44 grams |
| Vegetable Oil | 4.5 grams |
| Sugar | 0.2 gram |
| Spices | 1.7 grams |
| Salt | 0.6 gram |

47 grams of this sauce was combined with 50 grams of Corn Syrup Solids (22-24 DE) (containing approximately 40 grams of dextrin) and 3 grams of high methoxy pectin. Dehydration of the sauce at the product interface was effected by initial water migration into the pizza dough crust. Upon storage in a sealed container, no additional migration of fluids from the pizza sauce into the crust was observed.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for preventing the migration of fluid from a high moisture phase to a low moisture phase of a dough-based composite food product, said process comprising the steps of taking said composite having a high moisture phase containing at least 5% dextrin and at least 1% of another hydrophilic polysaccharide gelling agent; and dehydrating said high moisture phase for a period of time sufficient to provide a barrier film of substantially reduced moisture permeability of the interface between said low moisture phase and said high moisture phase.

2. A dough-based composite food product having a high moisture phase in contiguous relationship with a low moisture phase and said composite having a moisture impermeable barrier at the interface between said high moisture and low moisture phases, said barrier being formed by surface dehydration of the high moisture phase containing the reaction products of at least 5% dextrin and at least 1% of another hydrophilic polysaccharide gelling agent whereby said barrier prevents migration of moisture from the high moisture phase to the low moisture phase.

3. The invention of claim 1 or 2, wherein said hydrophilic polysaccharide gelling agent comprises pectin.

4. The process of claim 1 or 2 wherein said dehydrating step is effected before said high moisture component is incorporated into said composite product.

5. The process of claim 1 or 2 wherein said dehydrating step is effected after said high moisture phase is incorporated into said composite product.

6. The invention of claims 1 or 2, wherein said high moisture phase comprises a material selected from the group consisting of jelly, jam, preserves, fruit butter or marmalade.

7. The invention of claims 1 or 2, wherein said high moisture phase is a tomato-based sauce.

8. The invention of claims 1 or 2, wherein said low moisture phase is a dough-based product.

9. The invention of claim 8 wherein said dough-based product is selected from the group consisting of cookies, cakes, pies, pastries, doughnuts, pancakes, waffles, taco shells and pizza crusts.

10. The invention of claim 3 wherein said pectin is present in an amount of from about 1 to 5% by weight of said high moisture phase.

11. The invention of claim 10 wherein said dextrin is present in an amount of from about 5 to 50% by weight of said high moisture phase.

12. A baked filled cookie product comprising a dough-based portion and a high moisture filling portion, said high moisture filling portion comprising a jelly or jam composition containing at least 1% by weight pectin and at least 5% by weight dextrin and having formed by surface dehydration at the interface between said filling and cookie, a moisture impermeable barrier, whereby said barrier prevents the migration of moisture from said filling portion to said dough-based portion.

13. A process for preventing the migration of fluid from a high moisture phase to a low moisture phase of dough-based composite food product, said process comprising the steps of taking said composite having a high moisture phase containing about 5% dextrin and about 1% of another hydrophilic polysaccharide gelling agent; and dehydrating said high moisture phase for a period of time sufficient to provide a barrier film of substantially reduced moisture permeability at the interface between said low moisture phase and said high moisture phase.

14. A dough-based composite food product having a high moisture phase in contiguous relationship with a low moisture phase and said composite having a moisture impermeable barrier at the interface between said high moisture and low moisture phases, said barrier being formed by surface dehydration of the high moisture phase containing the reaction products of about 5% dextrin and about 1% of another hydrophilic polysaccharide gelling agent whereby said barrier prevents migration of moisture from the high moisture phase to the low moisture phase.

15. A baked filled cookie product comprising a dough-based portion and a high moisture filling portion, said high moisture filling portion comprising a jelly or jam composition containing about 1% by weight pectin and about 5% by weight dextrin and having formed by surface dehydration at the interface between said filling and cookie, a moisture impermeable barrier, whereby said barrier prevents the migration of moisture from said filling portion to said dough-based portion.

* * * * *